(12) United States Patent  
Samada et al.

(10) Patent No.: US 9,185,327 B2  
(45) Date of Patent: Nov. 10, 2015

(54) IMAGE DISPLAY DEVICE, METHOD FOR INDICATING CONNECTOR, AND CONNECTOR

(75) Inventors: Yuji Samada, Tokyo (JP); Michiyasu Morikawa, Tokyo (JP); Kazumoto Kondo, Tokyo (JP); Yasuhisa Nakajima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1966 days.

(21) Appl. No.: 12/317,391

(22) Filed: Dec. 22, 2008

(65) Prior Publication Data

US 2009/0167946 A1  Jul. 2, 2009

(30) Foreign Application Priority Data

Dec. 26, 2007  (JP) ............................... P2007-333532

(51) Int. Cl.
| | |
|---|---|
| *H04N 5/46* | (2006.01) |
| *H04N 5/445* | (2011.01) |
| *G09G 5/00* | (2006.01) |
| *H04N 21/436* | (2011.01) |
| *H04N 21/485* | (2011.01) |
| *H04N 21/4363* | (2011.01) |
| *H04N 5/00* | (2011.01) |

(52) U.S. Cl.
CPC ........... *H04N 5/44513* (2013.01); *G09G 5/006* (2013.01); *H04N 21/436* (2013.01); *H04N 21/43632* (2013.01); *H04N 21/485* (2013.01); *G09G 2370/047* (2013.01); *G09G 2370/12* (2013.01); *H04N 5/00* (2013.01); *H04N 21/43635* (2013.01)

(58) Field of Classification Search
None
See application file for complete search history.

(56) References Cited

U.S. PATENT DOCUMENTS

| | | | | |
|---|---|---|---|---|
| 6,149,464 | A * | 11/2000 | DeBauche et al. | 439/607.4 |
| 6,220,964 | B1* | 4/2001 | Miyamoto et al. | 463/43 |
| 7,539,883 | B2* | 5/2009 | Kojou et al. | 713/320 |
| 2004/0095509 | A1 | 5/2004 | Okamoto et al. | |
| 2005/0106930 | A1* | 5/2005 | Wu et al. | 439/489 |
| 2006/0234564 | A1* | 10/2006 | Pharn et al. | 439/676 |
| 2007/0264862 | A1* | 11/2007 | Hallberg | 439/489 |
| 2009/0156051 | A1* | 6/2009 | Doyle et al. | 439/489 |

FOREIGN PATENT DOCUMENTS

| | | | | |
|---|---|---|---|---|
| JP | 4-123775 | A | 4/1992 | |
| JP | 5-174900 | A | 7/1993 | |
| JP | 2007-072840 | A * | 3/2007 | ............... G06F 3/48 |
| JP | 2007072840 | A | 3/2007 | |
| JP | 2007-134956 | A | 5/2007 | |
| JP | 2009111864 | A | 5/2009 | |
| WO | WO-02-078336 | A1 | 10/2002 | |

OTHER PUBLICATIONS

Office Action from Japanese Application No. 2007-333532, dated Mar. 23, 2010.

* cited by examiner

*Primary Examiner* — Dave Czekaj  
*Assistant Examiner* — Mohammad J Rahman  
(74) *Attorney, Agent, or Firm* — Hazuki International, LLC

(57) ABSTRACT

An image display device and a connector are disclosed. The image display device includes: a connector connected with a cable through which a video signal is transmitted; a display panel for displaying an image based on the video signal inputted via the cable to the connector from an external apparatus; and a display controller for displaying a connector indication indicating the connector on the display panel. The connector includes a cable detection mechanism for detecting presence or absence of a connection of the cable, and the display controller changes a connector indication mode displayed on the display panel, according to a detection result of the cable detection mechanism.

14 Claims, 17 Drawing Sheets

FIG. 5

HDMI PIN ARRAY (IN CASE OF TYPE-A)

| PIN | SIGNAL ASSIGNMENT | PIN | SIGNAL ASSIGNMENT |
|---|---|---|---|
| 1 | TMDS DATA2+ | 2 | TMDS DATA2 SHIELD |
| 3 | TMDS DATA2− | 4 | TMDS DATA1+ |
| 5 | TMDS DATA1 SHIELD | 6 | TMDS DATA1− |
| 7 | TMDS DATA0+ | 8 | TMDS DATA0 SHIELD |
| 9 | TMDS DATA0− | 10 | TMDS CLOCK+ |
| 11 | TMDS CLOCK SHIELD | 12 | TMDS CLOCK− |
| 13 | CEC | 14 | RESERVED (N.C. ON DEVICE) |
| 15 | SCL | 16 | SDA |
| 17 | DDC/CEC GROUND | 18 | +5V POWER |
| 19 | HOT PLUG DETECT | | |

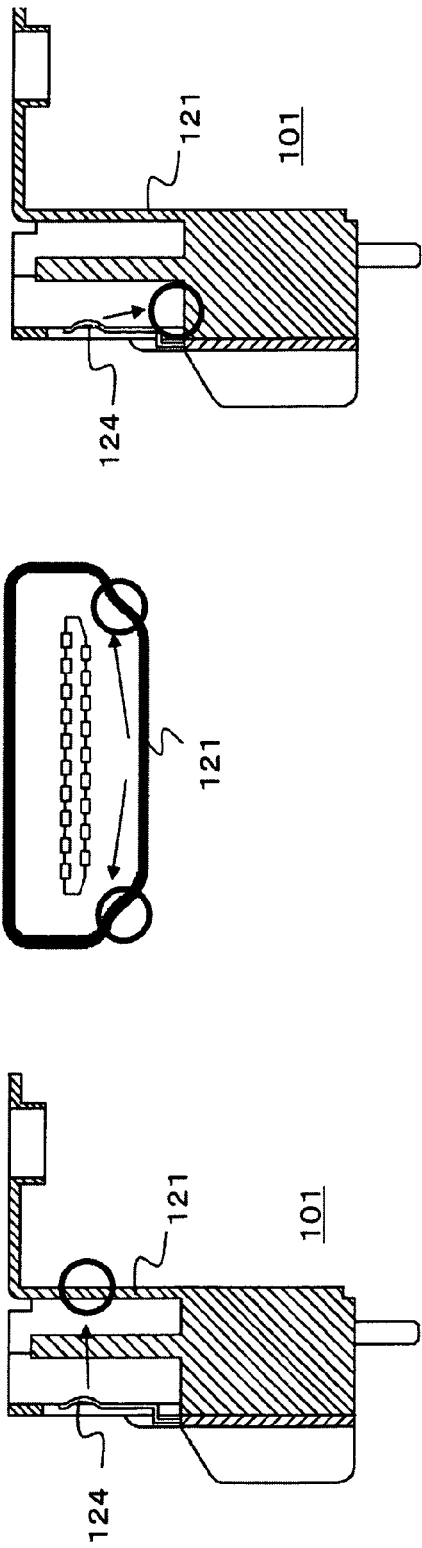

IMAGE DISPLAY DEVICE, METHOD FOR INDICATING CONNECTOR, AND CONNECTOR

CROSS-REFERENCE TO RELATED APPLICATIONS

The present application claims benefit of priority of Japanese patent Application No. 2007-333532 filed in the Japanese Patent Office on Dec. 26, 2007, the entire disclosure of which is incorporated herein by reference.

BACKGROUND OF THE INVENTION

1. Field of the Invention

The present invention relates an image display device, a connector indication method, and a connector.

2. Description of Related Art

In recent years, an HDMI (High Definition Multimedia Interface) has gradually become widespread as a communication interface for transmitting a digital image signal, i.e., a baseband (uncompressed) image signal (video signal) and an audio signal accompanying the image signal, from a digital versatile disc (DVD) player, a set-top box, and other AV (Audio Visual) sources to, for example, a television receiver (TV), a projector, and other displays, at high speed.

For example, there is a detailed description of an HDMI standard in International Publication WO 2002/078336.

SUMMARY OF THE INVENTION

For example, in a television receiver installed with an HDMI connector (HDMI terminal), the HDMI connector does not have a cable detecting function. Therefore, a user is unable to verify the presence or absence of a cable connection to the HDMI connector, on a display panel. Thus, when the user performs an input switching by displaying each connector including the HDMI connector on the display panel, for example, the user sometimes performs a wasted operation such as selecting an HDMI connector which is not connected with a cable.

With a hot plug detect (HPD) regulated by the HDMI, it is possible to detect in the television receiver that a source apparatus in an active state is connected to the HDMI connector via the cable. When the source apparatus is not in an active state, the same state as that in which the cable is not connected is established. Consequently, the detection of even the presence or absence of the cable connection becomes difficult.

Accordingly, it is desirable to enable an on-screen easy verification of presence or absence of a cable connection to a connector. Further, it is desirable to enable an on-screen easy verification of presence or absence of a connection of an active apparatus to the connector.

In accordance with an aspect of the present invention, there is provided an image display device including: a connector connected with a cable through which a video signal is transmitted; a display panel for displaying an image based on the video signal inputted via the cable from an external apparatus to the connector; and a display controller for displaying a connector indication indicating the connector, on the display panel. The connector includes a cable detection mechanism for detecting presence or absence of a connection of the cable. The display controller changes a connector indication mode displayed on the display panel, according to a detection result of the cable detection mechanism.

In the embodiment, the connector connected with a cable through which the video signal is transmitted is provided, and an image based on the video signal inputted to the connector via the cable from the external apparatus is displayed on the display panel. On this display panel, a user interface screen at a time of performing an input switching, for example, is displayed with a connector indication (a mark, a character, and the like.) indicating a connector. The connector is a connector, like an HDMI connector, for example, for inputting a baseband video signal transmitted via the cable by a differential signal from the external apparatus through a plurality of channels.

The connector has a cable detection mechanism for detecting presence or absence of a connection of the cable. The cable detection mechanism is composed of, for example, a contact piece attached to an outer sheath of the connector in an electrically floated state, and is configured, when the cable is connected to the connector, such that the outer sheath of the connector and the contact piece are electrically connected via a plug provided in an end of the cable fitted into the outer sheath of the connector. With this configuration, when the outer sheath of the connector is grounded, for example, the contact piece also is in a ground state when the cable is connected to the connector, and thus, the presence or absence of the connection of the cable can be easily detected.

By the display controller, a connector indication mode displayed on the display panel, for example, a concentration, a hue, a shape, and the like is changed in accordance with a detection result of the cable detection mechanism. For example, as compared to the connector indication indicating the connector which is connected with the cable, the connector indication indicating the connector which is not connected with the cable is subtle. In this way, the connector indication mode displayed on the display panel is changed depending on whether the cable is connected. Thus, the presence or absence of the cable connection to the connector can be easily verified on the screen, thereby improving a selection operability of an external input.

In this embodiment, for example, the display controller may be configured to display on the display panel an apparatus indication indicating an apparatus connected to the connector, in association with a connector indication, displayed on the display panel, indicating a connector connected with a cable. In this case, a user is able to easily verify on the screen of the display panel the apparatus connected to the connector, whereby improving a selection operability of an external input.

In the embodiment, there may be further provided: a user operation unit for selecting a connector indication displayed on the display panel to perform an input switching; and a selection limiting unit for limiting a connector indication selectable by the user operation unit to a connector indication indicating a connector connected with the cable, according to a detection result of the cable detection mechanism, for example. In this case, a selection cursor selectively moves to only the connector indication indicating the connector connected with the cable, and thus, an unnecessary operation can be omitted from a cursor moving operation by a user, and further, an erroneous selection, by the user, of the connector indication indicating the connector which is not connected with the cable can be avoided.

In this case, the display controller may be configured to display controller displays connector indications selectable with the user operation unit by bringing together connector indications in a predetermined range. Consequently, difficulty in viewing resulting from movement of the selection cursor at an irregular period can be avoided. In this case, the display controller may be configured not to display a connector indication indicating the connector which is not connected with the cable, on the display panel. This removes an unnecessary connector indication from the display panel, so that the connector indication indicating a selectable connector can be easily viewed.

In the embodiment, there may be further included an active determination unit for determining, on the basis of a potential state of a predetermined line of a cable connected to the connector, whether an external apparatus in an active state is connected via the cable. The display controller may change a connector indication mode displayed on the display panel, according to a detection result of the cable detection mechanism and a determination result of the active determination unit. In this case, it is possible to easily verify not only the presence or absence of the cable connection to the connector but also the presence or absence of the connection of the active external apparatus to the connector connected with the cable, on the screen.

In accordance with another aspect of the present invention, there is provided an image display device, including: a connector connected with a cable through which a video signal is transmitted; a display panel for displaying an image based on the video signal inputted via the cable from an external apparatus to the connector; a display controller for displaying a connector indication indicating the connector on the display panel; an active determination unit for determining, on the basis of a potential state of a predetermined line of a cable connected to the connector, whether an external apparatus connected via the cable is in an active state. The display controller changes a connector indication mode displayed on the display panel, according to a detection result of the active determination unit.

In this embodiment, the connector connected with a cable through which the video signal is transmitted is provided, and an image based on the video signal inputted to the connector via the cable from the external apparatus is displayed on the display panel. On this display panel, a user interface screen at a time of performing an input switching, for example, is displayed with a connector indication (a mark, a character, and the like) indicating a connector. The connector is, for example, a connector, like an HDMI connector, for inputting a baseband video signal transmitted via the cable by a differential signal from the external apparatus through a plurality of channels.

On the basis of a potential state of a predetermined line of a cable connected to a connector, whether an external apparatus in an active state is connected via a cable is determined, and in response to a determination result thereof, a connector indication mode, e.g., a concentration, a hue, and a shape, displayed on a display panel is changed. For example, a connector indication indicating a connector which is not connected with an external apparatus in an active state is added with a dotted-line frame. In this way, depending on whether the external apparatus in an active state is connected, the connector indication mode displayed on the display panel is changed. Thus, the presence or absence of the connection of the external apparatus in an active state to the connector can be easily verified on the screen.

In this embodiment, for example, there may be provided: a user operation unit for selecting a connector indication displayed on the display panel to perform an input switching. The user operation unit may limit a connector indication selectable by the user operation unit, to a connector indication indicating a connector connected via the cable with an external apparatus in an active state, according to a determination result of the active determination unit. In this case, for example, a selection cursor selectively moves only to a connector indication indicating a connector connected with an external apparatus in an active state, and thus, an unnecessary operation may be omitted from the cursor moving operation by a user, and further, an erroneous selection, by the user, of a connector indication indicating a connector which is not connected with the cable, or is connected with an external apparatus which is not in an active state can be avoided.

In this embodiment, for example, the connector may include a cable detection mechanism for detecting presence or absence of a connection of the cable, and the display controller may change a connector indication mode displayed on the display panel, according to a determination result of the active determination unit and a detection result of the cable detection mechanism.

The cable detection mechanism may be composed of a contact piece attached to an outer sheath of the connector in an electrically floated state, for example, and may be configured, when the cable is connected to the connector, such that the outer sheath of the connector and the contact piece are electrically connected via a plug provided in an end of the cable fitted into the outer sheath of the connector. With this configuration, when the outer sheath of the connector is grounded, for example, the contact piece also is in a ground state when the cable is connected to the connector, so that the presence or absence of the connection of the cable can be easily detected.

According to the detection result of the cable detection mechanism together with the determination result of the active determination, the connector indication mode displayed on the display panel is changed. Consequently, it is possible to easily verify, with respect to the connector which is not connected with an external apparatus in an active state, the presence or absence of the connection of the cable, therefore, whether it is in a state of allowing to use if the external apparatus is brought into an active state, on the screen.

In accordance with a further aspect of the present invention, there is provided a connector connected with a cable through which a video signal is transmitted, and the connector including a cable detection mechanism for detecting presence or absence of a connection of the cable.

In this embodiment, there is provided the cable detection mechanism for detecting presence or absence of the connection of the cable. For example, the cable is to transmit a baseband video signal by a differential signal through a plurality of channels. The cable detection mechanism is composed of a contact piece attached to an outer sheath in an electrically floated state, for example, and is configured, when the cable is connected, such that the outer sheath and the contact piece are electrically connected via a plug provided in an end of the cable fitted into the outer sheath. With this configuration, when the outer sheath is grounded, for example, the contact piece also is in a ground state when the cable is connected, so that the presence or absence of the connection of the cable can be easily detected.

In this way, when the cable detection mechanism for detecting presence or absence of a cable connection is provided, the connection of the cable can be easily detected. For example, at a time of displaying the connector indication indicating a connector on the display panel, it is possible to easily change the display mode depending on the presence or absence of the connection of the cable.

According to embodiments of the present invention, in response to a detection result of the cable detection mechanism for detecting the presence or absence of the cable connection to the connector, the connector indication mode displayed on the display panel is changed, and thus, the presence or absence of the cable connection to the connector can be easily verified on the screen. Further, according to embodiments of the present invention, in response to a potential state of a predetermined line of a cable connected to the connector, the connector indication mode displayed on the display panel is changed, and thus, the presence or absence of the connection of the active apparatus to the connector can be easily verified on the screen. According embodiments of the present invention, the cable detection mechanism for detecting presence or absence of a cable connection is provided, and thus, the presence or absence of the connection of the cable can be easily detected.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

FIG. 5 is a table showing a pin array (type A) of an HDMI connector;

FIGS. 10A, 10B, and 10C are diagrams each for describing another example of an attaching position of the contact piece;

DETAILED DESCRIPTION OF EMBODIMENTS

Figure 1:
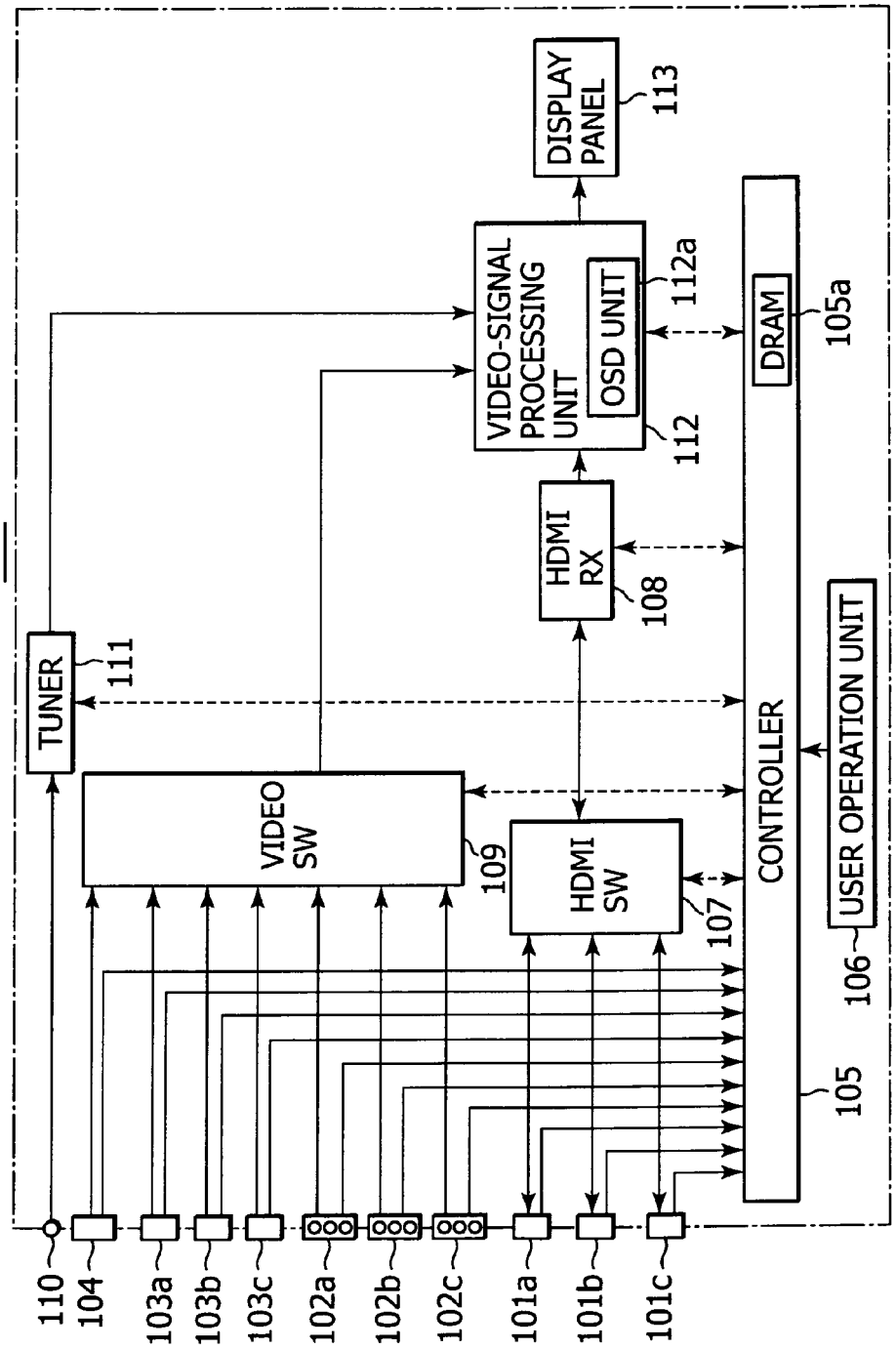
FIG. 1 is a block diagram showing a configuration example of a television receiver as an embodiment of the present invention.

Hereinafter, with reference to drawings, an embodiment of the present invention will be described. FIG. 1 shows a configuration example of a television receiver 100, as an embodiment. For the sake of simplicity, in the following description, a description about an audio system is omitted.

The television receiver 100 includes: HDMI connectors 101a to 101c; component video connectors 102a to 102c; composite video connectors 103a to 103c; a personal computer (PC) connector 104; a controller 105; a user operation unit 106; an HDMI switcher (HDMI SW) 107; an HDMI receiving unit (HDMI RX) 108; a video switcher (video SW) 109; an antenna terminal 110; a tuner 111; a video-signal processing unit 112; and a display panel 113. The television receiver 100 constitutes a sink apparatus of an HDMI.

The controller 105 controls operation of each component of the television receiver 100. The user operation unit 106 constitutes a user interface, and is connected to the controller 105. The user operation unit 106 includes: a key, a button, and a dial, which are placed on a case (not shown) of the television receiver 100, or a remote-controlled transmitting/receiving apparatus, etc.

The controller 105 includes a DRAM 105a. The DRAM 105a is stored therein with: cable connection information to the HDMI connectors 101a to 101c, the component video connectors 102a to 102c, the composite video connectors 103a to 103c, and the PC connector 104, connection information of an external apparatus in an active state to the HDMI connectors 101a to 101c, etc.

Herein, the cable connection information to the HDMI connectors 101a to 101c, the component video connectors 102a to 102c, the composite video connectors 103a to 103c, and the PC connector 104 are obtained from a cable detection mechanism (not shown in FIG. 1) provided in each connector. The cable detection mechanisms are each configured to detect the connection of the cable to the connector by a mechanical switch, for example. The cable detection mechanisms in the HDMI connectors 101a to 101c are described later.

The connection information of the external apparatus (source apparatus) in an active state to the HDMI connectors 101a to 101c is obtained from a 19th pin. i.e., a potential state of an HPD pin. That is, when the external apparatus in an active state is connected, the voltage of the HPD pin becomes high. Thus, the controller 105 is able to obtain the connection information by monitoring the voltage of the HPD pin. In this sense, the controller 105 constitutes an active determination unit.

At a time of selecting an external input by the user, for example, the controller 105 changes a connector indication mode displayed on the display panel 113, on the basis of the cable connection information described above and the connection information of the external apparatus in an active state. In this sense, the controller 105 constitutes a display controller. A detail of display control in the controller 105 is described later.

The HDMI switcher 107 selectively connects the HDMI connectors 101a to 101c to the HDMI receiving unit 108 under the control of the controller 105. The HDMI receiving unit 108 is selectively connected via the HDMI switcher 107 to any one of the HDMI connectors 101a to 101c. The HDMI receiving unit 108 receives a baseband video signal (image signal) transmitted unidirectionally from the external apparatuses (source apparatuses) connected to the HDMI connectors 101a to 101c, according to a communication that complies with the HDMI.

In this case, the HDMI receiving unit 108 performs an authentication of an HDCP (High-bandwidth Digital Content Protection system) with the external apparatus with each other, and thereafter, receives the baseband video signal (image signal) from the external apparatus, as described above. A detail of the HDMI receiving unit 108 is described later.

The video switcher 109 selectively derives a 1-system video signal from video signals inputted to the component video connectors 102a to 102c, the composite video connectors 103a to 103c, and the PC connector 104, and outputs the derived signal. The tuner 111 receives a broadcasting satellite (BS) broadcast, a terrestrial digital broadcasting, and the like, and outputs a video signal of a predetermined program of which station is selected. The tuner 111 is supplied with a broadcast signal caught by an antenna (not shown) connected to the antenna terminal 110.

The video-signal processing unit 112 performs a multi-screen processing, a superimposing processing of an information display signal for a user interface screen, and the like, as needed, on an image signal for an image display selected on the basis of a user selection operation, out of the video signal outputted from the HDMI receiving unit 108, the video signal outputted from the video switcher 109, and the video signal outputted from the tuner 111. The information display signal for a user interface screen is generated by an on screen display (OSD) circuit 112a provided in the video-signal processing unit 112 under the control of the controller 105. The video-signal processing unit 112 drives the display panel 113 on the basis of the processed image signal. The display panel 113 is composed of an LCD (Liquid Crystal Display), a PDP (Plasma Display Panel), or the like.

An operation of the television receiver 100 shown in FIG. 1 is described.

To the HDMI receiving unit 108, a baseband video signal, which undergoes a processing such as an encryption, is transmitted from the external apparatus (source apparatus), in an active state, connected to the HDMI connector selected by the HDMI switcher 107. In the HDMI receiving unit 108, a processing such as a decryption of an encryption on the received video signal is performed, so that a video signal is obtained. The video signal outputted from the HDMI receiving unit 108 is supplied to the video-signal processing unit 112.

The video signals inputted to the component video connectors 102a to 102c, the composite video connectors 103a to 103c, and the PC connector 104 are supplied to the video switcher 109. In the video switcher 109, a 1-system video signal is selected and the selected signal is outputted. The video signal outputted from the video switcher 109 is supplied to the video-signal processing unit 112.

The broadcast signal inputted to the antenna terminal 110 is supplied to the tuner 111. In the tuner 111, on the basis of the broadcast signal, a video signal of a predetermined program is obtained in response to a station-selection operation by the user. The video signal outputted from the tuner 111 is supplied to the video-signal processing unit 112.

In the video-signal processing unit 112, out of the video signal outputted from the HDMI receiving unit 108, the video signal outputted from the video switcher 109, and the video signal outputted from the tuner 111, the video signal for an image display is selected on the basis of a user selection operation. In the video-signal processing unit 112, a multi-screen processing, a superimposing processing of the information display signal, and the like, are performed on the selected video signal, as needed, and on the basis of the processed video signal, the display panel 113 is driven. Thus, on the display panel 113, an image based on the video signal for an image display, selected on the basis of the user selection operation, is displayed. Further, as needed, an information display is performed in a manner to superimpose on this image.

Figure 2:
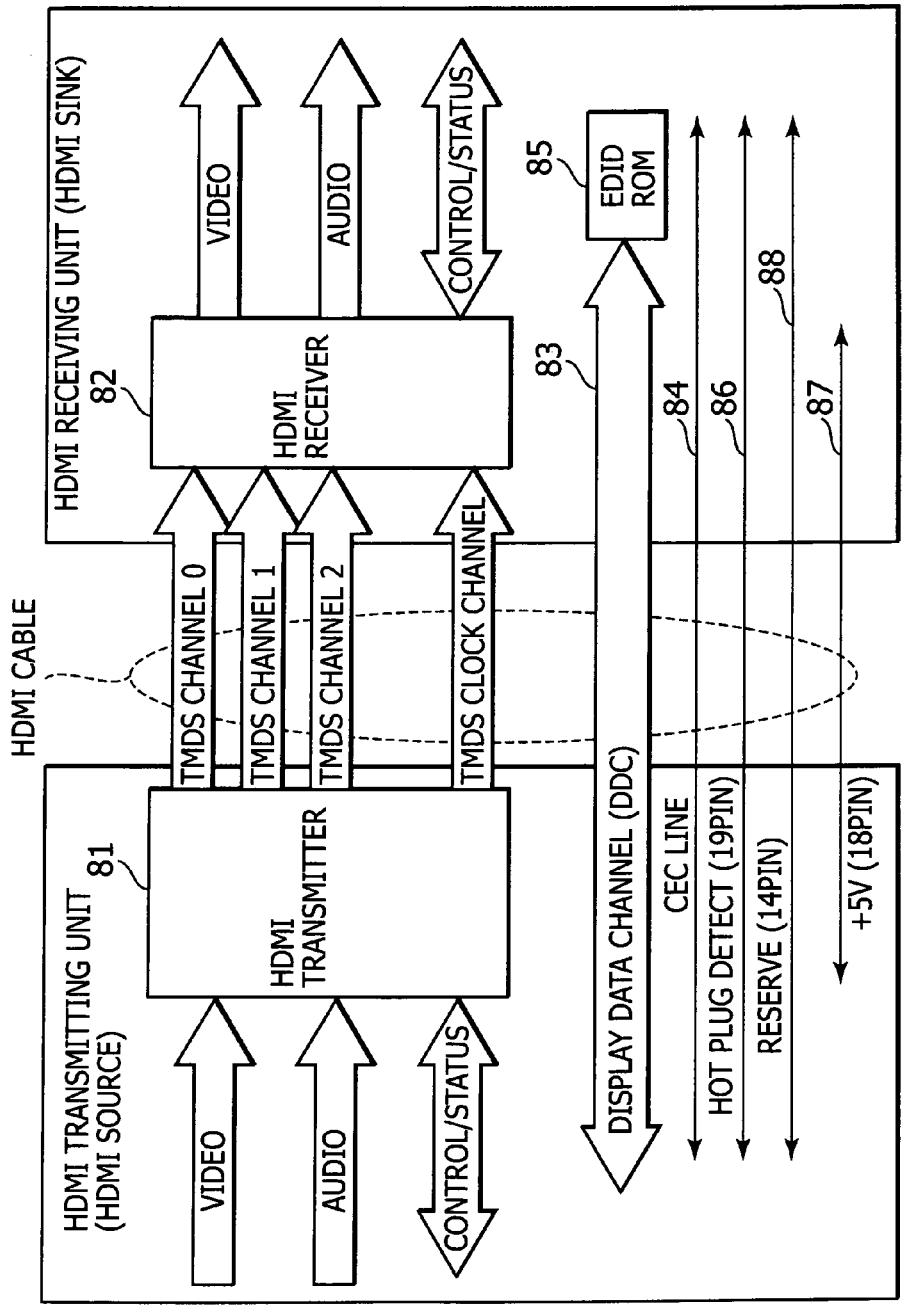
FIG. 2 is a block diagram showing a configuration example of an HDMI transmitting unit of a source apparatus and an HDMI receiving unit of a sink apparatus.

FIG. 2 shows a configuration example of the HDMI transmitting unit (HDMI source) of the source apparatus of the HDMI and the HDMI receiving unit (HDMI sink) of the sink apparatus.

In an effective image period (hereinafter, appropriately referred also to as "active video period"), i.e., a period obtained by removing a horizontal blanking period and a vertical blanking period from a period that lasts from one vertical synchronizing signal to a subsequent vertical synchronizing signal, the HDMI transmitting unit transmits unidirectionally a differential signal corresponding to the pixel data of a non-compressed 1-screen image to the HDMI receiving unit through a plurality of channels, and in one of the horizontal blanking period and the vertical blanking period, the HDMI transmitting unit also transmits differential signals corresponding to the audio data (audio signal) which accompanies at least the image data (video signal), the control data, other auxiliary data, etc., unidirectionally to the HDMI receiving unit through a plurality of channels.

That is, the HDMI transmitting unit includes a transmitter 81. The transmitter 81 converts the pixel data of the uncompressed image into a corresponding differential signal, and serially and unidirectionally transmits the converted signal to the HDMI receiving unit connected via the HDMI cable through a plurality of channels, i.e., three TMDS channels #0, #1, and #2, for example.

The transmitter 81 further converts the audio data that accompanies the uncompressed image, the necessary control data, other auxiliary data, etc., into corresponding differential signals, and serially and unidirectionally transmits the converted signals to the HDMI receiving unit connected via the HDMI cable through the three TMDS channels #0, #1, and #2.

The transmitter 81 further transmits a pixel clock synchronized with the pixel data transmitted through the three TMDS channels #0, #1, and #2, to the HDMI receiving unit connected via the HDMI cable through a TMDS clock channel. In this case, through one TMDS channel #i (i=0, 1, 2), during one clock of the pixel clock, 10-bit pixel data is transmitted.

In the active video period, the HDMI receiving unit receives the differential signal which is transmitted unidirectionally from the HDMI transmitting unit through a plurality of channels and which corresponds to the pixel data, and in one of the horizontal blanking period and the vertical blanking period, the HDMI receiving unit receives the differential signals which are transmitted unidirectionally from the HDMI transmitting unit through a plurality of channels and which correspond to the audio data or the control data.

That is, the HDMI receiving unit includes a receiver 82. The receiver 82 receives the differential signal corresponding to the pixel data and the differential signals corresponding to the audio data or the control data, transmitted unidirectionally from the HDMI transmitting unit connected via the HDMI cable through the TMDS channels #0, #1, and #2, in synchronism with the pixel clock similarly transmitted through the TMDS clock channel from the same HDMI transmitting unit.

A transport channel of the HDMI system formed of the HDMI transmitting unit and the HDMI receiving unit includes: the three TMDS channels #0 to #2 which are transmission channels for serially and unidirectionally transmitting, from the HDMI transmitting unit to the HDMI receiving unit, the pixel data and the audio data, in synchronism with the pixel clock; the TMDS clock channel which is a transmission channel for transmitting the pixel clock; and in addition, a transmission channel called a display data channel (DDC) 83 and a CEC line 84.

The DDC 83 is formed of two signal lines (not shown) included in the HDMI cable, and used by the HDMI transmitting unit to read out E-EDID (Enhanced Extended Display Identification Data) from the HDMI receiving unit connected via the HDMI cable.

That is, the HDMI receiving unit includes, in addition to the HDMI receiver 82, an EDID ROM 85 stored therein with the E-EDID which is capability information about its own capability (configuration/capability). The HDMI transmitting unit reads out the E-EDID of the HDMI receiving unit via the DDC 83 from the HDMI receiving unit connected via the HDMI cable, and on the basis of the E-EDID, recognizes an image format (profile) with which an electronic apparatus having the HDMI receiving unit is compatible, for example. Examples of the image format include RGB, YCbCr 4:4:4, and YCbCr 4:2:2.

The CEC line 84 is formed of one signal line (not shown) included in the HDMI cable, and used for performing a bi-directional communication of data for control between the HDMI transmitting unit and the HDMI receiving unit.

The HDMI cable also includes a line 86 connected to a pin called an HPD (Hot Plug Detect). The source apparatus may utilize the line 86 to detect the connection of the sink apparatus. The HDMI cable further includes a line 87 used for providing a power supply to the sink apparatus from the source apparatus. The HDMI cable also includes a reserve line 88.

Figure 3:
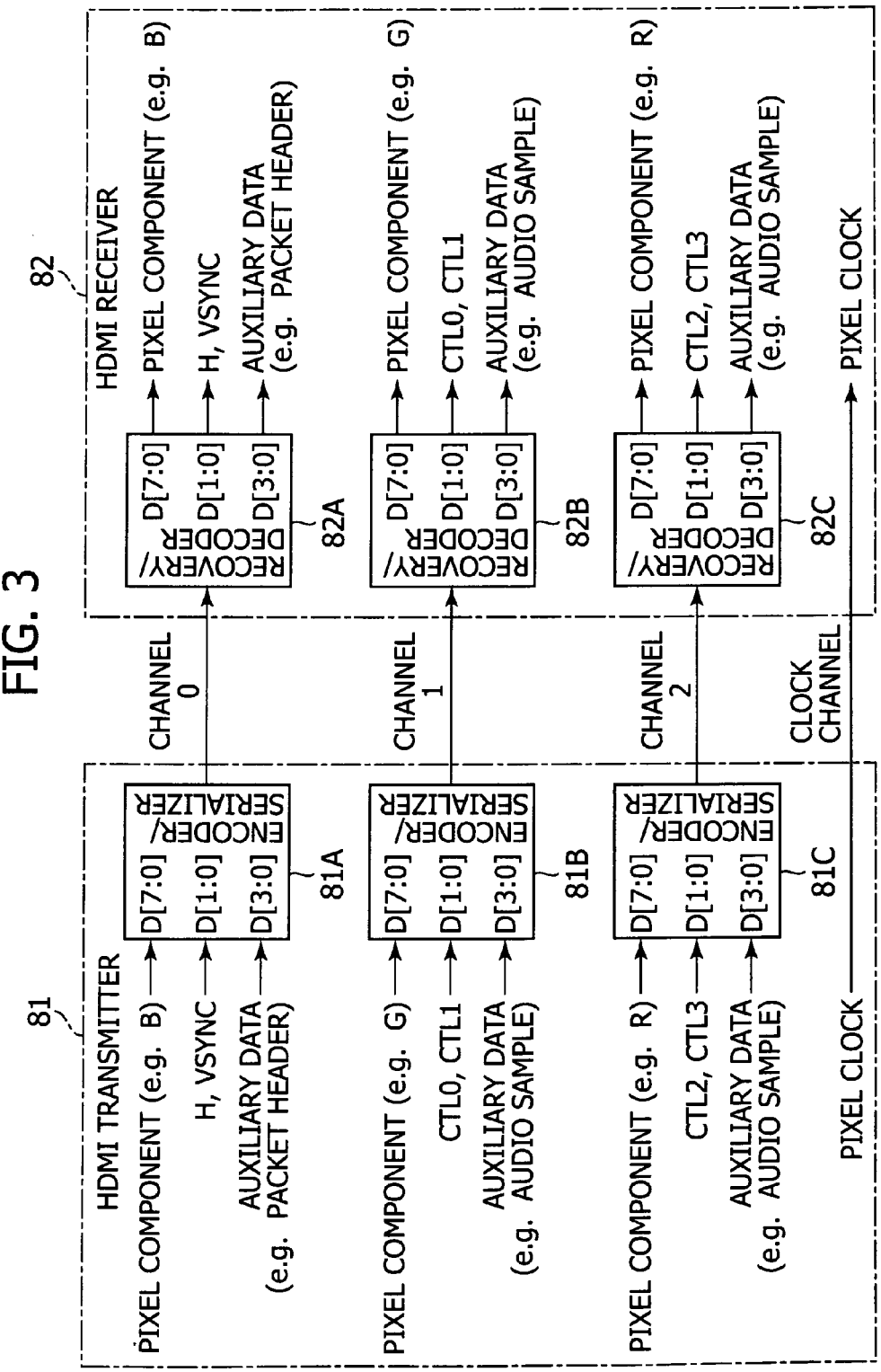
FIG. 3 is a block diagram showing a configuration example of an HDMI transmitter and an HDMI receiver.

FIG. 3 shows a configuration example of the HDMI transmitter 81 and the HDMI receiver 82 in FIG. 2.

The transmitter 81 includes three encoders/serializers 81A, 81B, and 81C, each of which corresponds to the three TMDS channels #0, #1, and #2. Each of the encoders/serializers 81A, 81B, and 81C encodes the image data, the auxiliary data, and the control data supplied thereto, converts the encoded data from parallel data to serial data, and transmits the converted data by the differential signal. When the image data has three components, for example, R (red), G (green), and B (blue), a B component is supplied to the encoder/serializer 81A, a G component is supplied to the encoder/serializer 81B, and an R component is supplied to the encoder/serializer 81C.

Examples of the auxiliary data include audio data and a control packet. The control packet is supplied to the encoder/serializer 81A, and the audio data is supplied to the encoders/serializers 81B and 81C, for example.

Examples of the control data include a 1-bit vertical synchronizing signal (VSYNC), a 1-bit horizontal synchronizing signal (HSYNC), and control bits CTL0, CTL1, CTL2, and CTL3, each of which is one bit. The vertical synchronizing signal and the horizontal synchronizing signal are supplied to the encoder/serializer 81A. The control bits CTL0 and CTL1 are supplied to the encoder/serializer 81B, and the control bits CTL2 and CTL3 are supplied to the encoder/serializer 81C.

The encoder/serializer 81A transmits in a time division manner the B component of the image data, the vertical synchronizing signal and the horizontal synchronizing signal, and the auxiliary data, each of which is supplied to the encoder/serializer 81A. That is, the encoder/serializer 81A converts the B component of the image data supplied to the encoder/serializer 81A into parallel data of an 8-bit unit which is a fixed bit number. The encoder/serializer 81A encodes the parallel data, converts the encoded data into serial data, and transmits the converted data through the TMDS channel #0.

The encoder/serializer 81A encodes 2-bit parallel data of the vertical synchronizing signal and the horizontal synchronizing signal supplied to the encoder/serializer 81A, converts the encoded data into serial data, and transmits the converted data through the TMDS channel #0. The encoder/serializer 81A further converts the auxiliary data supplied thereto into 4-bit-unit parallel data. The encoder/serializer 81A encodes the parallel data, converts the encoded data into serial data, and transmits the converted data through the TMDS channel #0.

The encoder/serializer 81B transmits in a time division manner the G component of the image data, the control bits CTL0 and CTL1, and the auxiliary data, each of which is supplied to the encoder/serializer 81B. That is, the encoder/serializer 81B converts the G component of the image data supplied to the encoder/serializer 81B into parallel data of an 8-bit unit, which is a fixed bit number. The encoder/serializer 81B further encodes the parallel data, converts the encoded data into serial data, and transmits the converted data through the TMDS channel #1.

The encoder/serializer 81B encodes the 2-bit parallel data of the control bits CTL0 and CTL1 supplied to the encoder/serializer 81B, converts the encoded data into serial data, and transmits the serial data through the TMDS channel #1. The encoder/serializer 81B further converts the auxiliary data supplied thereto into 4-bit-unit parallel data. The encoder/serializer 81B encodes the parallel data, converts the encoded data into serial data, and transmits the converted data through the TMDS channel #1.

The encoder/serializer 81C transmits in a time division manner the R component of the image data, the control bits CTL2 and CTL3, and the auxiliary data, each of which is supplied to the encoder/serializer 81C. That is, the encoder/serializer 81C converts the R component of the image data supplied to the encoder/serializer 81C into parallel data of an 8-bit unit, which is a fixed bit number. The encoder/serializer 81C encodes the parallel data, converts the encoded data into serial data, and transmits the converted data through the TMDS channel #2.

The encoder/serializer 81C encodes the 2-bit parallel data of the control bits CTL2 and CTL3 supplied to the encoder/serializer 81C, converts the encoded data into serial data, and transmits the serial data through the TMDS channel #2. The encoder/serializer 81C converts the auxiliary data supplied thereto into 4-bit-unit parallel data. The encoder/serializer 81C encodes the parallel data, converts the encoded data into serial data, and transmits the serial data through the TMDS channel #2.

The receiver 82 includes three recovery/decoders 82A, 82B, and 82C, which correspond to the three TMDS channels #0, #1, and #2, respectively. Each of the recovery/decoders 82A, 82B, and 82C receives the image data, the auxiliary data, and the control data, transmitted by the differential signal through the TMDS channels #0, #1, and #2. Each of the recovery/decoders 82A, 82B, and 82C converts the image data, the auxiliary data, and the control data, from the serial data into the parallel data, decodes the converted data, and outputs the decoded data.

That is, the recovery/decoder 82A receives the B component of the image data, the vertical synchronizing signal and horizontal synchronizing signal, and the auxiliary data transmitted by the differential signal through the TMDS channel #0. The recovery/decoder 82A converts the B component of the image data, the vertical synchronizing signal and the horizontal synchronizing signal, and the auxiliary data from the serial data into the parallel data, decodes the converted data, and outputs the decoded data.

The recovery/decoder 82B receives the G component of the image data, the control bits CTL0 and CTL1, and the auxiliary data transmitted by the differential signal through the TMDS channel #1. The recovery/decoder 82B converts the G component of the image data, the control bits CTL0 and CTL1, and the auxiliary data, from the serial data into the parallel data, decodes the converted data, and outputs the decoded data.

The recovery/decoder 82C receives the R component of the image data, the control bits CTL2 and CTL3, and the auxiliary data, transmitted by the differential signal through the TMDS channel #2. The recovery/decoder 82C converts the R component of the image data, the control bits CTL2 and CTL3, and the auxiliary data, from the serial data into the parallel data, decodes the converted data, and outputs the decoded data.

Figure 4:
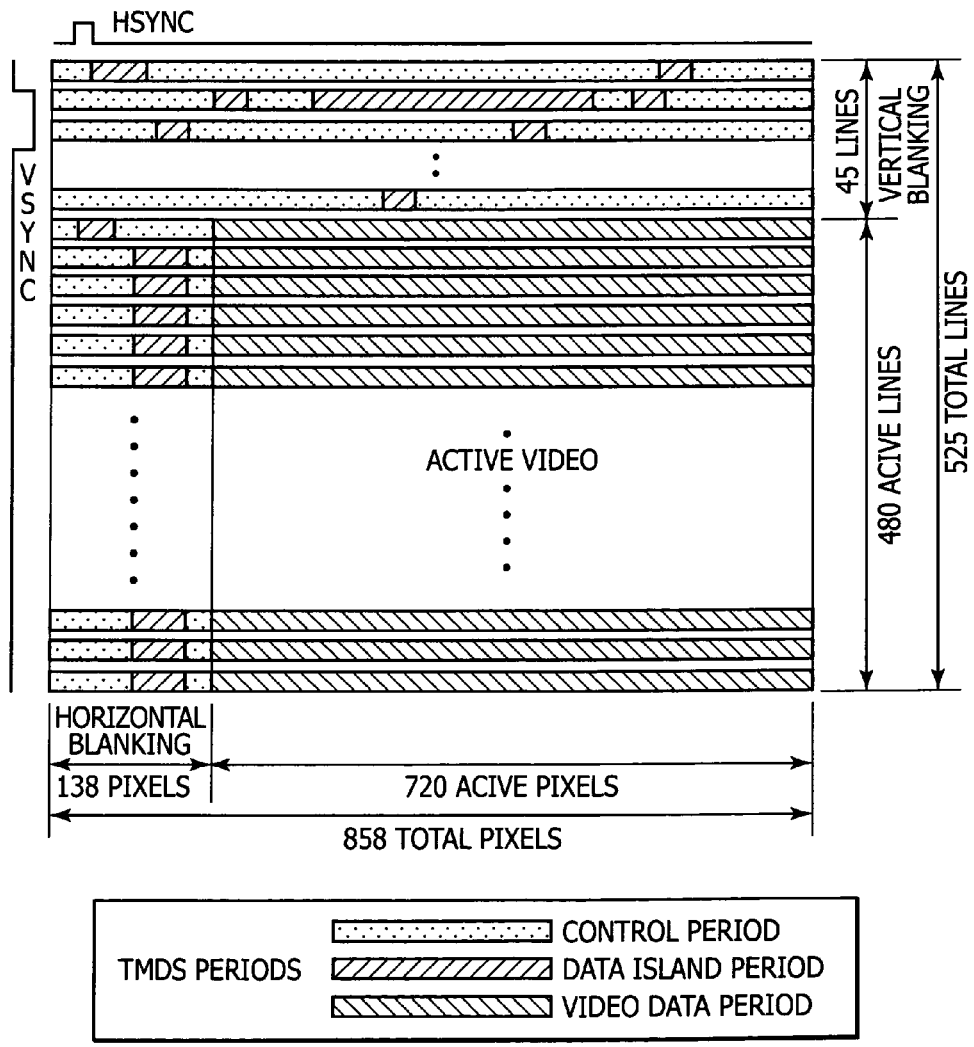
FIG. 4 is a diagram showing a structure of TMDS transport data.

FIG. 4 shows an example of a transmission period in which various transmission data are transmitted through the three TMDS channels #0, #1, and #2 of the HDMI. FIG. 4 shows periods of the various transmission data when a progressive image which is composed of 720 pixels horizontally and 480 pixels vertically is transmitted through the TMDS channels #0, #1, and #2.

In a video field in which the transmission data are transmitted through the three TMDS channels #0, #1, and #2 of the HDMI, there exist three types of periods, i.e., a video data period, a data island period, and a control period, depending on types of the transmission data.

In this case, the video field period is a period which lasts from an active edge of a certain vertical synchronizing signal to an active edge of a subsequent vertical synchronizing signal, and is divided into: the horizontal blanking period; the vertical blanking period; and the active video period obtained by removing the horizontal blanking period and the vertical blanking period from the video field period.

The video data period is allocated to the active video period. In this video data period, data of an active pixel composed of 720 pixels×480 lines which constitutes uncompressed 1-screen image data is transmitted.

The data island period and the control period are allocated to the horizontal blanking period and the vertical blanking period. In the data island period and the control period, the auxiliary data is transmitted.

That is, the data island period is allocated to a part of the horizontal blanking period and the vertical blanking period. In the data island period, out of the auxiliary data, data which is not related to control, e.g., a packet of the audio data, etc., are transmitted.

The control period is allocated to other periods of the horizontal blanking period and the vertical blanking period. In this control period, out of the auxiliary data, data related to control, e.g., the vertical synchronizing signal, the horizontal synchronizing signal, the control packet, and the like, are transmitted.

Herein, according to the current HDMI, a frequency of the pixel clock transmitted through the TMDS clock channel is, for example, 165 MHz, and in this case, a transmission rate of the data island period is the order of 500 Mbps.

Figure 6:
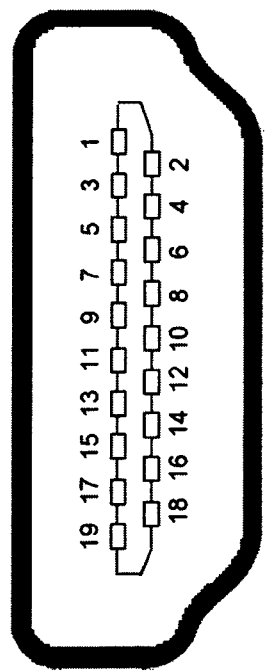
FIG. 6 is a diagram showing a position of each pin in the HDMI connector.

FIG. 5 shows a pin array of the HDMI connector. This pin array is an example of a type-A. FIG. 6 shows a position of each pin in the HDMI connector.

Two lines, i.e., differential lines through which TMDS Data#i+ and TMDS Data#i− which are differential signals of the TMDS channel #i are transmitted, are connected to pins (of which the pin numbers are 1, 4, and 7) allocated with the TMDS Data#i+ and pins (of which the pin numbers are 3, 6, and 9) allocated with the TMDS Data#i−.

The CEC line 84 through which the CEC signal, i.e., the data for control, is transmitted is connected to the pin of which the pin number is 13, and the pin of which the pin number is 14 is a reserved pin. A line through which an SDA (Serial Data) signal such as the E-EDID is transmitted is connected to the pin of which the pin number is 16, and a line through which an SCL (Serial Clock) signal, i.e., a clock signal used for synchronizing at the time of transmitting and receiving the SDA signal, is transmitted is connected to the pin of which the pin number is 15. The DDC 83 described above is composed of the line through which the SDA signal is transmitted and the line through which the SCL signal is transmitted.

As described above, the line 86 used by the source apparatus to detect the connection of the sink apparatus is connected to the pin of which the pin number is 19. As described above, the line 87 for providing the power supply is connected to the pin of which the pin number is 18.

Figure 7A:
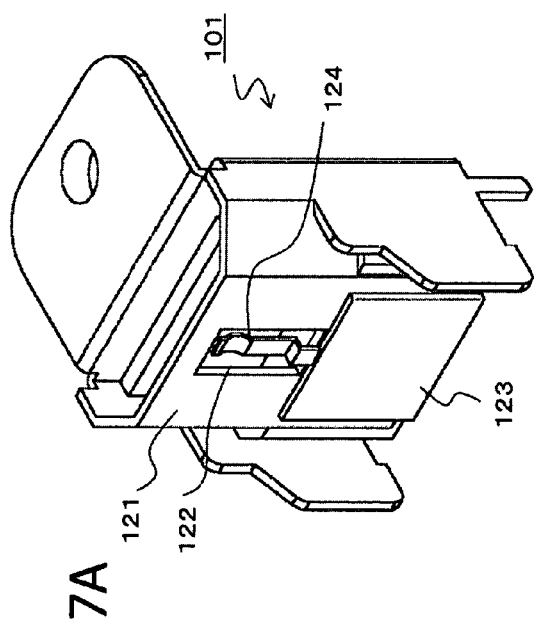
FIGS. 7A, 7B, and 7C are diagrams each for describing a structure, operation, etc., of a cable detection mechanism of the HDMI connector.
Figure 7B:
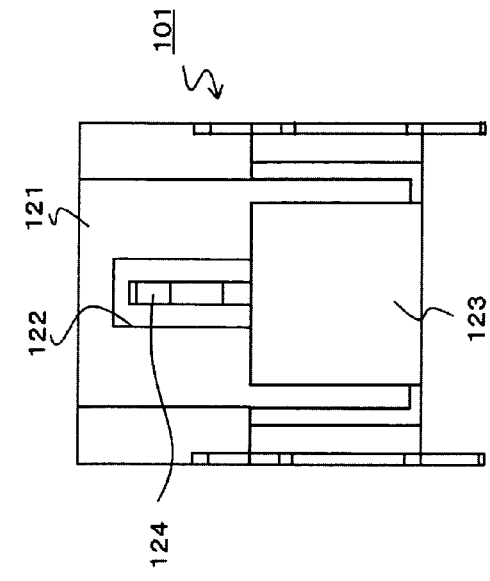
Figure 7C:
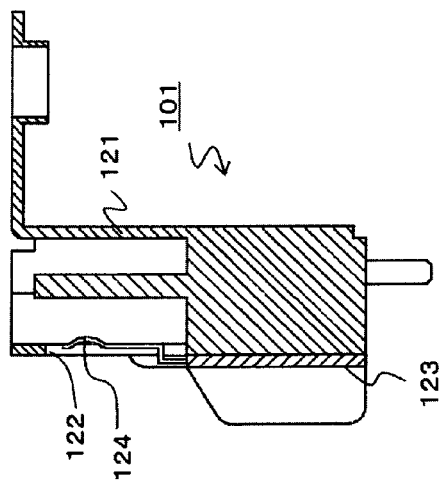

Subsequently, with reference to FIGS. 7A to 7C, the cable detection mechanism of the HDMI connector 101 (101*a* to 101*c*) is described. FIG. 7A is a schematic perspective view of the HDMI connector 101, FIG. 7B is a schematic bottom surface view of the HDMI connector 101, and FIG. 7C is a schematic cross-sectional view of the HDMI connector 101.

An outer sheath (shell) 121 of the HDMI connector 101 is formed of a metal member having electrical conductivity. On a bottom surface side of the outer sheath (shell) 121, a rectangular opening 122 is formed. The bottom surface side of the HDMI connector 101 is fixed with a rectangular-shaped insulating plate 123, formed of a synthetic resin or the like, is placed so that the one end is arranged along a one-end side of the opening 122.

An end of the insulating plate 123 is fixed with a distal-end side of a contact piece 124. The contact piece 124 is composed of a metal member having electrical conductivity and springiness. A free-end side of the contact piece 124 is molded into a waveform shape of which the convex portion passes through the opening 122 to protrude into an internal portion (portion into which a plug of the HDMI cable is inserted) of the outer sheath 121.

Figure 8:
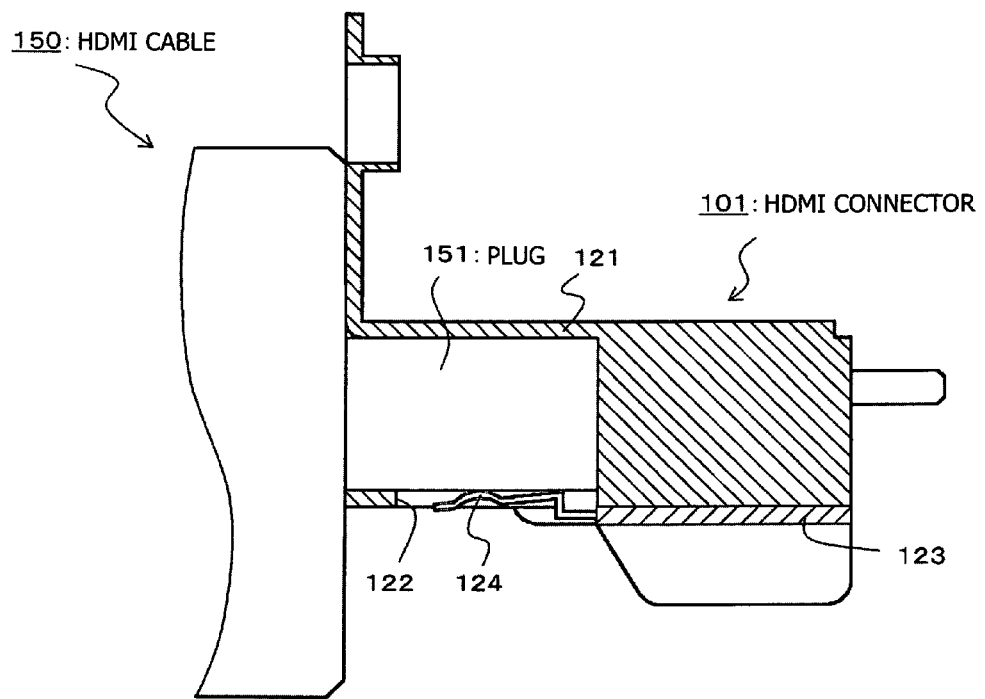
FIG. 8 is a diagram showing a connection state of a plug of an HDMI cable, an outer sheath (shell) of an HDMI connector, and a contact piece, at a time of connecting the HDMI cable to the HDMI connector.

FIG. 8 shows a state a plug 151 provided at an end of an HDMI cable 150 is inserted in order to connect the HDMI cable 150 to the HDMI connector 101. In this case, the plug 151 is in a state of contacting the outer sheath (shell) 121 of the HDMI connector 101 and contacting also the contact piece 124.

That is, in a state where the HDMI cable 150 is not connected to the HDMI connector 101, the outer sheath 121 of the HDMI connector 101 and the contact piece 124 are in a non-electrically contacting state. However, in a state where the HDMI cable 150 is connected to the HDMI connector 101, the outer sheath 121 of the HDMI connector 101 and the contact piece 124 are in an electrically contacting state via the plug 151. The outer sheath 121 of the HDMI connector 101 (101*a* to 101*c*) provided in the television receiver 100 is placed in a ground state.

Figure 9A:
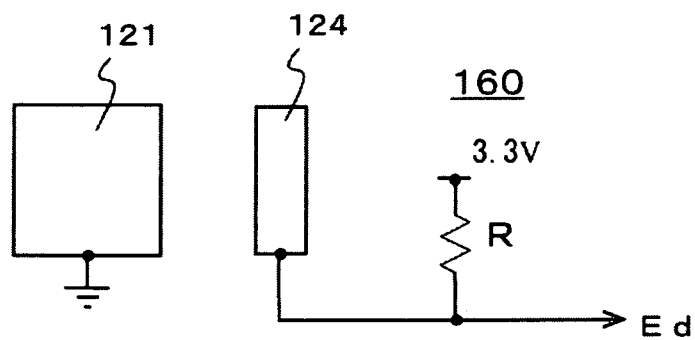
FIGS. 9A and 9B are diagrams each for describing a configuration example of a detecting circuit for detecting presence or absence of a cable connection.
Figure 9B:
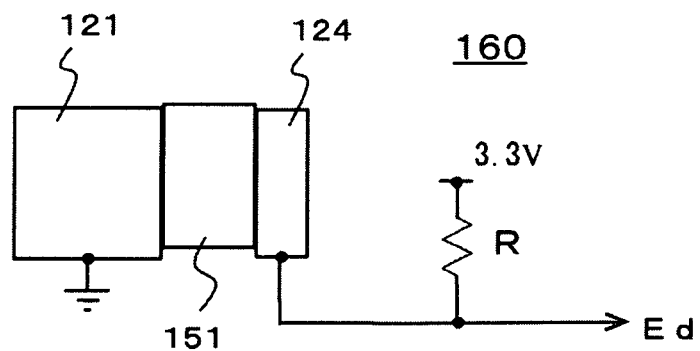

Therefore, by using a detecting circuit 160 as shown in FIGS. 9A and 9B, a detection output Ed indicating presence or absence of the connection of the HDMI cable 150 can be obtained. The detecting circuit 160 is configured so that the contact piece 124 is pulled-up to, for example, 3.3V, through a resistance R, and the detecting output Ed is obtained from a connection point between the resistance R and the contact piece 125.

FIG. 9A shows a state where the HDMI cable 150 is not connected to the HDMI connector 101. In this state, the outer sheath 121 of the HDMI connector 101 and the contact piece 124 are not electrically connected. Consequently, the detection output Ed is 3.3V, which indicates no connection of the HDMI cable 150.

On the other hand, FIG. 9B shows a state where the HDMI cable 150 is connected to the HDMI connector 101. In this state, the outer sheath 121 of the HDMI connector 101 and the contact piece 124 are electrically connected via the plug 151, and thus, the detection output Ed is 0V (ground potential), which indicates the presence of the connection of the HDMI cable 150.

In the examples shown in FIGS. 7A, 7B, and 7C, and FIG. 8, the HDMI connector in which the contact piece 124 constituting the cable detection mechanism is attached on the bottom-surface side of the outer sheath (shell) 121 of the HDMI connector 101 is shown. However, the position of attaching the contact piece 124 is not limited to that shown in these examples. Examples of the position of attaching the contact piece 124 may include: an upper-surface side of the outer sheath 121 of the HDMI connector 101, of which the attaching position is as indicated by a circle in FIG. 10A; side-surface sides of the outer sheath 121 of the HDMI connector 101, of which the attaching positions are as indicated by circles in FIG. 10B; and a deepest portion that a tip end of the plug 151 of the HDMI cable 150 contacts, of which the attaching position is as indicated by a circle in FIG. 10C.

In the HDMI connector in which the contact piece 124 is attached on the bottom-surface side of the outer sheath 121, as shown in FIGS. 7A, 7B, and 7C, and FIG. 8, the attaching of the contact piece 124 is easy in view of manufacturing the connector. On the other hand, in the HDMI connector in which the contact piece 124 is attached on the upper-surface side of the outer sheath 121 (see the circle position in FIG. 10A), a surface to which the plug 151 corresponds is often uniform, whereby snagging does not easily occur. In the HDMI connector in which the contact piece 124 is attached on the side-surface side of the outer sheath 121 (see the circle position in FIG. 10B), the inserted plug 151 may be sandwiched from both sides, which can increase contact precision. In the HDMI connector in which the contact piece 124 is attached to the deepest portion that the tip end of the plug 151 contacts (see the circle position in FIG. 10C), leading a signal line from the contact piece 124 is facilitated.

Further, the HDMI connector 101 is provided with a cable detecting terminal 165 to lead the signal line from the contact piece 124. The cable detecting terminal 165 is provided, together with a substrate mounting terminal corresponding to the existing 1st to 19th pins (see FIG. 5) which are present in the HDMI connector 101, for example.

Figure 11A:
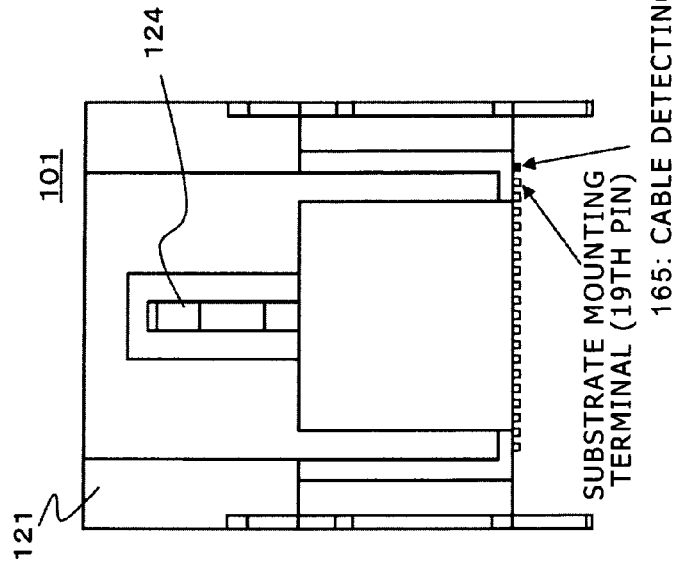
FIGS. 11A and 11B are diagrams each for describing a cable detecting terminal for leading a signal line from the contact piece.

That is, FIG. 11A shows an example in which the cable detecting terminal 165 used for leading the signal line from the contact piece 124 is provided, as described above, adjacent to the substrate mounting terminal, corresponding to the 1st pin, connected with a differential line through which TMDS Data2+, out of the TMDS Data2+ and TMDS Data2−, which are differential signals of the TMDS channel #2, is transmitted. In this case, as described above, when the HDMI cable 150 is connected to the HDMI connector 101, the contact piece 124 is a ground potential. Accordingly, the cable detecting terminal 165 also is a ground potential. As a result, this can be used for an impedance stability of the TMDS signal.

Figure 11B:
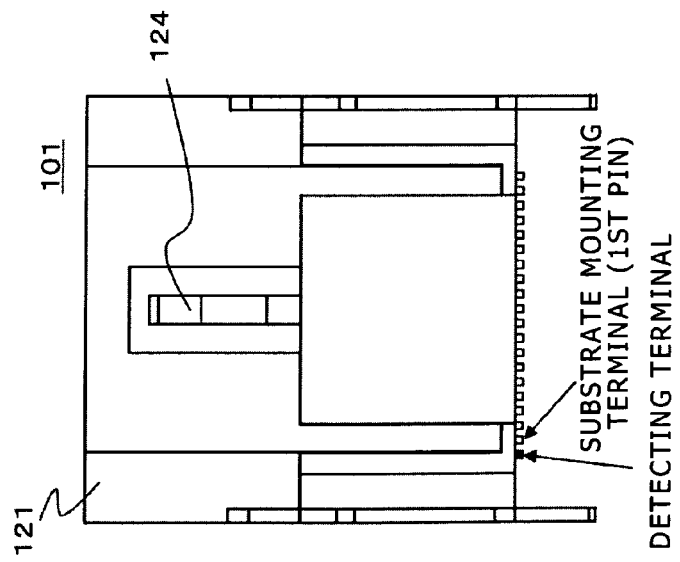

FIG. 11B shows an example in which the cable detecting terminal 165 used for leading the signal line from the contact piece 124, as described above, is provided adjacent to the substrate mounting terminal corresponding to the 19th pin, which is an HPD pin. In this case, as described above, when the HDMI cable 150 is connected to the HDMI connector 101, the contact piece 124 is a ground potential, and therefore, the cable detecting terminal 165 also is a ground potential. However, the cable detecting terminal 165 is positioned apart from the TMDS signal, so that an influence by the cable detecting terminal 165 on the TMDS line can be removed.

Figure 12:
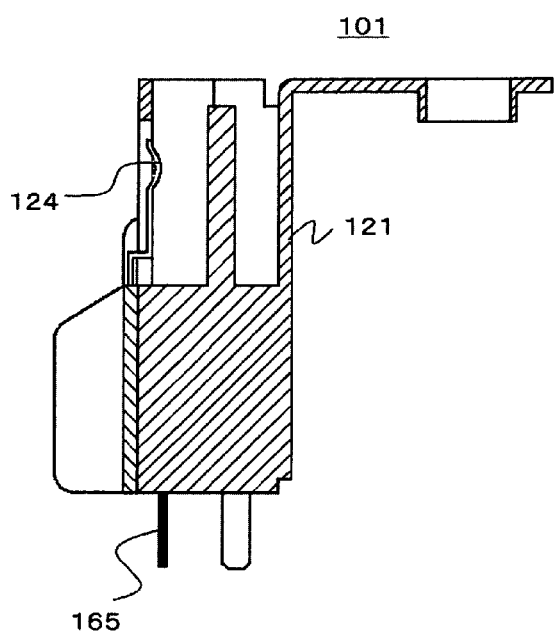
FIG. 12 is a diagram for describing the cable detecting terminal for leading the signal line from the contact piece.

For example, the cable detecting terminal 165 is provided to protrude from the outer sheath (shell) 121 of the HDMI connector 101 so as to be used also as a strength reinforcing pin at a time of mounting the HDMI connector 101, as shown in FIG. 12. In this case, it may become necessary to attach the cable detecting terminal 165 in an electrically floated state, from the outer sheath (shell) 121 of the HDMI connector 101.

Subsequently, a connector indication displayed on the display panel 113 at a time of selecting an external input by the user is described. The controller 105 changes a connector indication mode displayed on the display panel 113, based on the cable connection information described above and connection information of the external apparatus in an active state.

Figure 13:
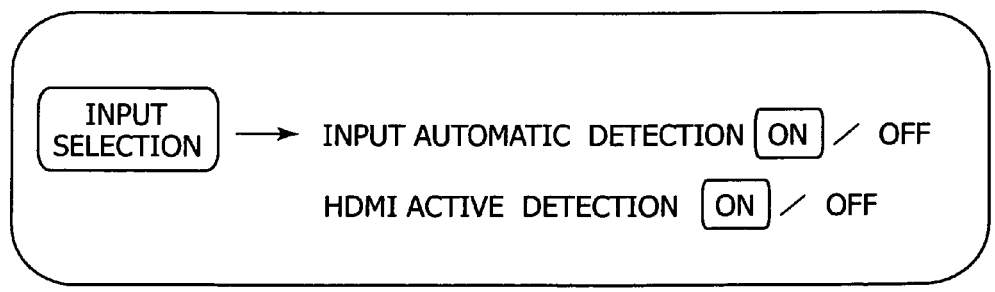
FIG. 13 is a diagram showing one example of a user interface screen at a time of setting whether to use cable connection information or connection information of an external apparatus in an active state.

In the connector indication at a time of selecting the external input, the user is able to set in advance whether to use the cable connection information or the connection information of the external apparatus in an active state. FIG. 13 shows an example of a user interface screen displayed on the display panel 113 at a time of the setting.

In this case, when an input automatic detection is turned on (ON), the use of the cable connection information is selected. When the input automatic detection is set to ON, the controller 105 obtains, at a predetermined timing such as at a time of turning on power or selecting the external input, the cable connection information to the HDMI connectors 101a to 101c, the component video connectors 102a to 102c, the composite video connectors 103a to 103c, and the PC connector 104, as described above, and stores the obtained connection information in the DRAM 105a. The obtained information is used as control information of the connector indication.

When an HDMI active detection is set to ON, the use of the connection information of the external apparatus in an active state is selected. When the HDMI active detection is set to ON, the controller 105 obtains, at a predetermined timing such as at a time of turning on power or selecting the external input, the connection information, of the external apparatus in an active state, to the HDMI connectors 101a to 101c, as described above, and stores the obtained connection information in the DRAM 105a. The stored information is used as control information of the connector indication.

Figure 14:
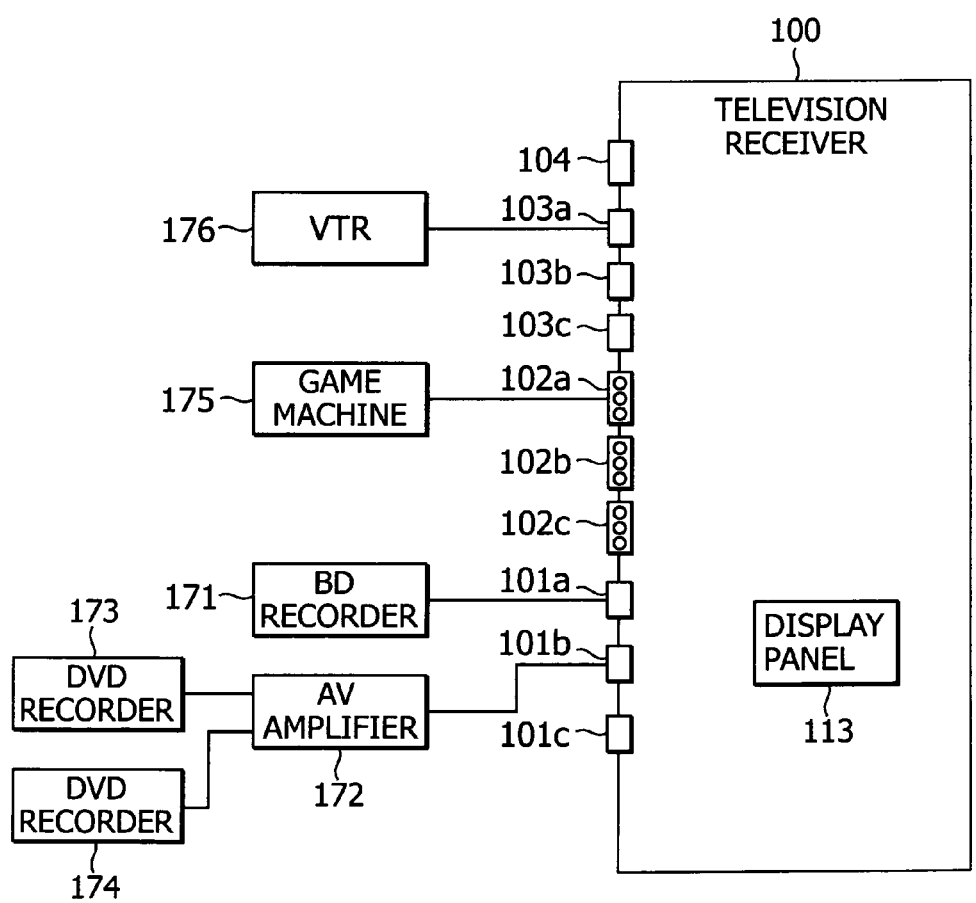
FIG. 14 is a block diagram showing one example of an apparatus connection of a television receiver to each connector.

Subsequently, an indication example of the connector indication at a time of selecting the external input is described. This indication example is a case where an apparatus is connected to each connector of the television receiver 100, as shown in FIG. 14. That is, the HDMI connector 101a is connected with a blue-ray (BD) Disc recorder 171. The HDMI connector 101b is connected via an AV (Audio-Visual) amplifier 172 with DVD (Digital Versatile Disc) recorders 173 and 174. The component video connector 102a is connected with a game machine 175, and the composite video connector 103a is connected with a video tape recorder (VTR) 176.

Figure 15B:
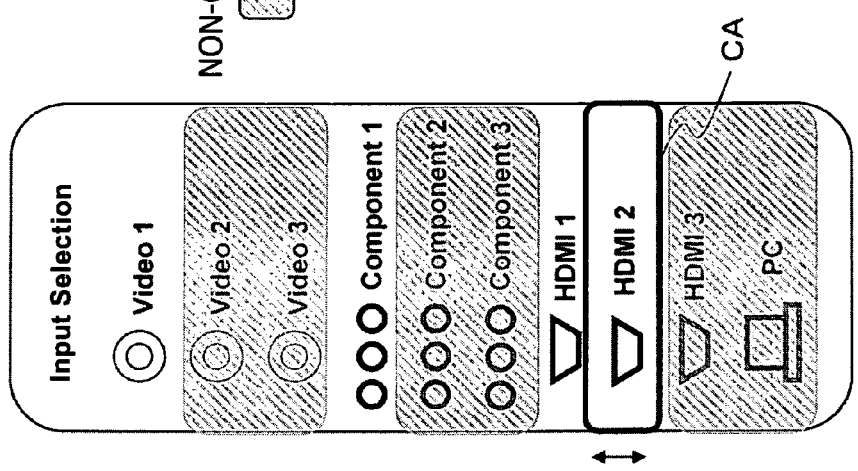
FIGS. 15A and 15B are diagrams each for describing a connector indication displayed on a display panel at a time of selecting an external input.
Figure 15A:
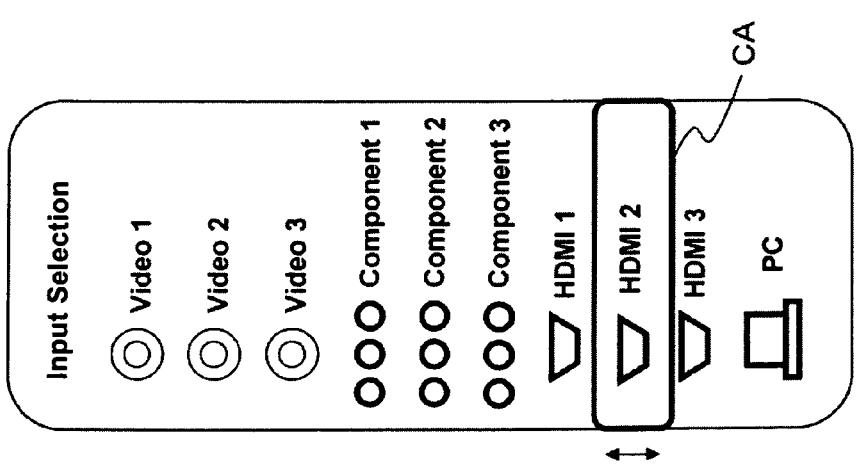

At first, when the input automatic detection is set to OFF and the HDMI active detection is set to OFF, the connector indication displayed on the display panel 113 at a time of selecting the external input is as shown in FIG. 15A, for example. In this case, the connector indication indicating the HDMI connectors 101a to 101c, the component video connectors 102a to 102c, the composite video connectors 103a to 103c, and the PC connector 104 are all displayed in the same mode, irrespective of presence or absence of a cable connection state, or irrespective of presence or absence of the connection of the external apparatus in an active state in the HDMI connectors 101a to 101c.

Herein, connector indications of "HDMI 1" to "HDMI 3" are connector indications indicating the HDMI connectors 101a to 101c. "Component 1" to "Component 3" are connector indications indicating the component video connectors 102a to 102c. "Video 1" to "Video 3" are connector indications indicating the composite video connectors 103a to 103c. "PC" is a connector indication indicating the PC connector.

In this state, the user is able to switch the input to a desired connector by moving a cursor CA to a desired connector position by the user operation unit 106 to determine it, for example, by a remote-controlled operation. However, in this case, all the connector indications indicating each connector are displayed in the same mode, and thus, the user may probably perform a wasted selection operation because the user is unable to recognize on the screen of the display panel 113 whether each connector is connected with the cable, and further, whether the HDMI connectors 101a to 101c are connected with the external apparatus in an active state.

Subsequently, when the input automatic detection is set to ON and the HDMI active detection is set to OFF, the connector indication displayed on the display panel 113 at a time of selecting the external input is an indication as shown in FIG. 15B, for example. In this case, between the connector indication indicating a connector which is connected with the cable ("HDMI 1", "HDMI 2", "Component 1", and "Video 1") and the connector indication indicating a connector which is not connected with the cable ("HDMI 3", "Component 2", "Component 3", "Video 1", "Video 3", and "PC"), a different mode, for example, a concentration, a hue, a shape, and the like, is set to change. For example, as compared to the connector indication indicating the connector which is connected with the cable, the connector indication indicating the connector which is not connected with the cable is subtle.

In this state, the user is able to switch the input to a desired connector by moving a cursor CA to a desired connector indication position by the user operation unit 106 to determine it, for example, by a remote-controlled operation. In this case, the connector indication mode is different depending on the presence or absence of the connection of the cable, so that the user is able to recognize on the screen of the display panel 113 the presence or absence of the connection of the cable to each connector, which can avoid the wasted selection operation, such as a selection of the connector which is not connected with the cable.

In this case, it may be possible that, by the control of the controller 105, the selection operation of the connector indication by the user is limited to the connector indication indicating the connector connected with the cable. In this case, the user is able to move the cursor CA to only the position of the connector indication indicating the connector connected with the cable, with the user operation unit 106, for example, by the remote-controlled operation, so that an unnecessary operation can be omitted from the cursor moving operation by the user, and further, an erroneous selection, by the user, of the connector indication indicating the connector which is not connected with the cable can be avoided.

Figure 16A:
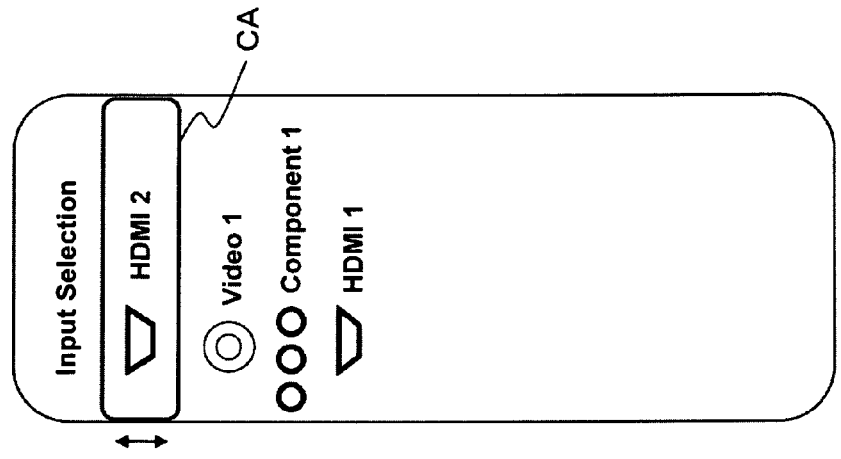
FIGS. 16A and 16B are diagrams each for describing a connector indication displayed on a display panel at a time of selecting an external input.

In this case, the connectors connected with the cable, i.e., the connector indication indicating the connectors selectable by the user, may be displayed by bringing together of them in a predetermined range, as shown in FIG. 16A. In the illustrative example, the connector indications are grouped in an upper-portion range. However, the connector indications may be displayed by bringing together of them in another range, for example, in a lower-portion range. The displaying by bringing together in this way in the predetermined range may avoid difficulty in viewing resulting from moving of the cursor CA at an irregular interval, and as a result, the operability can be improved.

Figure 16B:
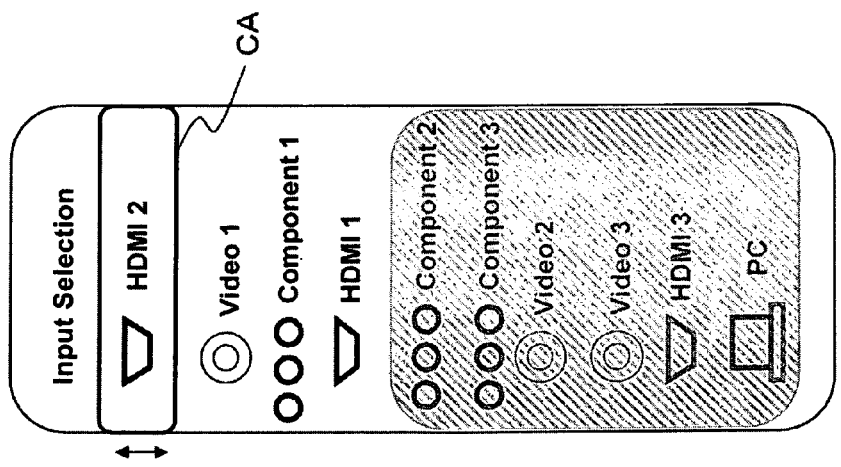

When the connector indications are displayed by being brought together in the predetermined range, the connector indication may be automatically sorted out in order of a higher selection frequency or may be sorted out arbitrarily by the user. Further, the display panel may be configured so that the connector, which is not connected with the cable, i.e., the connector indication indicating a connector unselectable by the user, is not to be displayed, as shown in FIG. 16B. In this case, an unnecessary connector indication can be removed from the display panel, so that the connector indication indicating a selectable connector can be easily viewed, which improves the operability.

Figure 17:
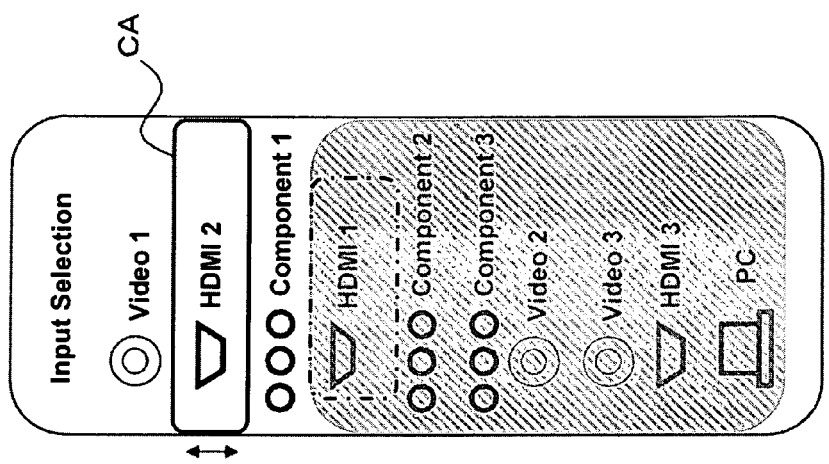
FIG. 17 is a diagram for describing a connector indication displayed on a display panel at a time of selecting an external input.

Subsequently, when the input automatic detection is set to ON and the HDMI active detection is set to ON, the connector indication displayed on the display panel 113 at a time of selecting the external input is as shown in FIG. 17B, for example. However, in this case, the BD recorder 171 connected to the HDMI connector 101a is in a power-off state, i.e., not in an active state.

In this case, between the connector indication ("HDMI 2", "Component 1", and "Video 1") indicating a connector connected with the cable (regarding the HDMI connector, a connector connected with an apparatus in an active state) and the connector indication ("HDMI 1", "HDMI 3", "Component 2", "Component 3", "Video 1", "Video 3", and "PC") indicating a connector which is not connected with the cable (regarding the HDMI connector, a connector which is not connected with a cable, or a connector which is not connected with an apparatus in an active state), a different mode such as a concentration, a hue, a shape, or the like, is set to change.

Regarding the "HDMI 1", i.e., a connector indication indicating the HDMI connector 101a which is connected with a cable but not connected with an apparatus in an active state, the mode is set different from the connector indication indicating the connector which is not connected with another cable. In the illustrative example, the "HDMI 1" is surrounded by a dashed-line frame and is distinguished from the connector indication indicating the connector which is not connected with another cable. As a result of distinguishing, the user is able to recognize that the HDMI connector 101a is connected with a cable but the connected apparatus is not in an active state.

In this state, the user is able to switch the input to a desired connector by moving a cursor CA to a desired connector indication position to determine it, with the user operation unit 106, for example, by a remote-controlled operation. In this case, the connector indication mode is different depending on the presence or absence of the connection of the cable, and thus, the user is able to recognize on the screen of the display panel 113 the presence or absence of the connection of the cable to each connector, and further, the user is able to recognize, regarding the HDMI connector, the presence or absence of the connection of the apparatus in an active state. As a result, it can avoid the wasted selection operation, such as a selection of the connector indication indicating the connector which is not connected with the cable, and regarding the HDMI connector, a selection of the connector indication indicating the connector connected with the apparatus which is not in an active state.

When an apparatus connected to each connector of the television receiver 100 is a CEC compatible apparatus, the television receiver 100 is able to recognize the existence of the apparatus. The use of the recognition information may be used at a time of selecting the external input. For example, when the user moves the cursor CA to a desired connector indication position with the user operation unit 106, by the remote-controlled operation, for example, and in this state, the user performs a display operation of the connection apparatus, the controller 105 may display the apparatus indication indicating the apparatus connected to the connector in association with the connector indication indicating the connector, as shown in FIG. 18, for example.

Figure 18:
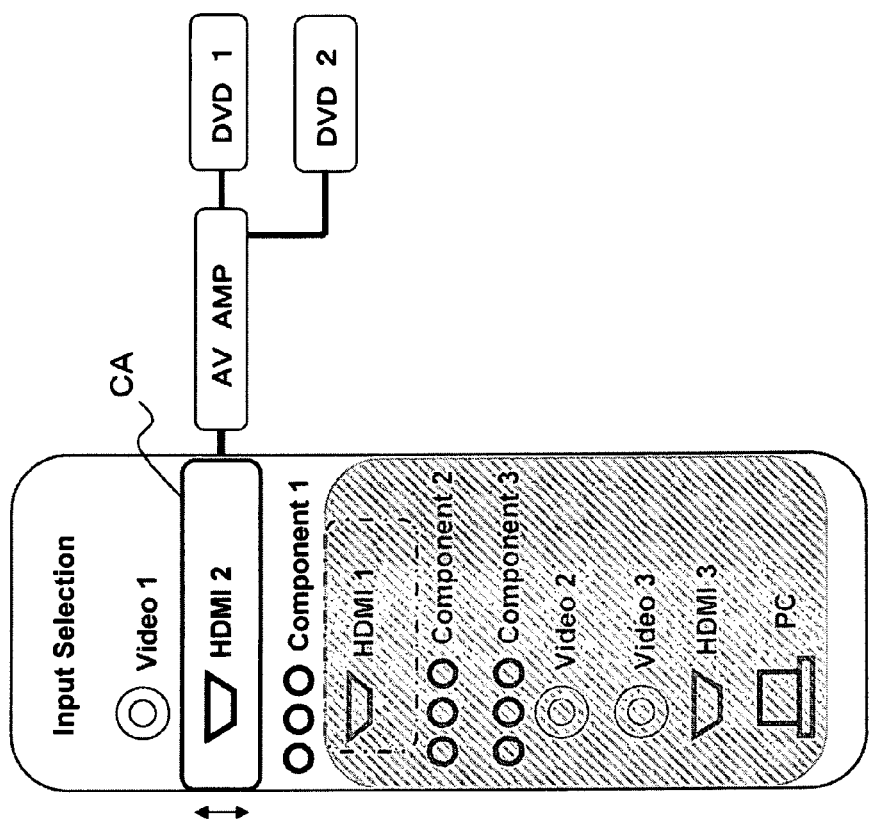
FIG. 18 is a diagram for describing a connector indication displayed on a display panel at a time of selecting an external input.

In a display example of FIG. 18, the apparatus indication indicating the connected apparatus is indicated in a tree-shaped structure. However, a display format is not limited thereto. Thus, when the apparatus indication indicating the apparatus connected to the connector is displayed in association with the connector indication, the user becomes able to verify the apparatus connected to each connector on the screen of the display panel 113, thereby improving the operability in a switching operation of the external input.

As described above, in the television receiver 100 shown in FIG. 1, according to a detection result of the presence or absence of the connection of the cable of each connector, and further, a determination result of the presence or absence of the connection of the active-state apparatus to the HDMI connector, the connector indication mode indicating each connector displayed on the display panel 113 is set to change at a time of selecting the external input. Thus, the user is able to easily verify the presence or absence of the cable connection to each connector and the presence or absence of the connection of the active-state apparatus to the HDMI connector, on the screen of the display panel 113. As a result, the selection operability of the external input can be improved.

In the television receiver 100 shown in FIG. 1, the HDMI connector 101 (101a to 101c) includes the cable detection mechanism composed of the contact piece 124, and the like, and thus, the presence or absence of the connection of the cable to the HDMI connector 101 can be satisfactorily detected.

In the embodiment described above, the present invention is applied to the television receiver. However, the present invention may also be applied to another image display device having a connector connected with a cable through which a video signal is transmitted. The number of each connector in the embodiment is exemplary, and is not limited to that in the embodiment. A shape of the HDMI connector in the aforementioned embodiment is exemplary, and is not limited to that in the embodiment.

Embodiments of the present invention allow to easily confirm the presence or absence of the cable connection to the connector on the screen, and the present invention may be applied to an image display device such as a television receiver including a connector, such as an HDMI connector, connected with a cable through which a video signal is transmitted.

It should be understood by those skilled in the art that various modifications, combinations, sub-combinations and alternations may occur depending on design requirements and other factors insofar as they are within the scope of the appended claims or equivalents thereof.

What is claimed is:

1. An image display device, comprising:
   a connector connected with a cable through which a video signal is transmitted;
   a display panel for displaying an image based on the video signal inputted via the cable to the connector from an external apparatus; and
   a display controller for displaying a connector indication indicating the connector, on the display panel,
   wherein the connector includes a cable detection mechanism for detecting presence or absence of a connection of the cable, and
   the display controller changes a connector indication mode displayed on the display panel, according to a detection result of the cable detection mechanism and a determination result of whether an external apparatus in an active state is connected via the cable, to display on the display panel indicia identifying a type of apparatus connected to the connector and uniquely identifying the connector, in association with a connector indication indicating the connector is in a first mode when the detection result is presence of a connection of the cable and in a second mode when the determination result is the external apparatus is not in an active state, the first mode being set different from the second mode and the second mode being displayed such that the connector being connected with the cable and the external apparatus not being in the active state is distinguished from display on the display panel of a third mode of the connector indication when the detection result is absence of a connection of the cable.

2. The image display device according to claim 1, wherein the connector is a connector for inputting a baseband video signal transmitted via the cable by a differential signal from the external apparatus through a plurality of channels.

3. The image display device according to claim 1, wherein:
   the cable detection mechanism is composed of a contact piece attached to an outer sheath of the connector in an electrically floated state, and
   when the cable is connected to the connector, the outer sheath of the connector and the contact piece are electrically connected via a plug provided in an end of the cable fitted into the outer sheath of the connector.

4. The image display device according to claim 1, further comprising:
   a user operation unit for selecting a connector indication displayed on the display panel to perform an input switching; and
   a selection limiting unit for limiting a connector indication selectable with the user operation unit to a connector indication indicating a connector connected with the cable, according to a detection result of the cable detection mechanism.

5. The image display device according to claim 4, wherein the display controller displays connector indications selectable with the user operation unit by bringing together the connector indications in a predetermined range.

6. The image display device according to claim 4, wherein the display controller does not display a connector indication indicating a connector which is not connected with the cable, on the display panel.

7. The image display device according to claim 1, further comprising an active determination unit for determining, on the basis of a potential state of a predetermined line of the cable connected to the connector, whether the external apparatus in the active state is connected via the cable,
   wherein the display controller changes a connector indication mode displayed on the display panel, according to a detection result of the cable detection mechanism and a determination result of the active determination unit.

8. A connector indication method in an image display device, the image display device including a connector connected with a cable through which a video signal is transmitted, and a display panel for displaying an image based on the video signal inputted via the cable to the connector from an external apparatus, the connector indication method comprising:
a connector indication step of displaying a connector indication indicating the connector, on the display panel; and
a display-mode changing step of changing a connector indication mode displayed on the display panel, according to a detection result of a cable detection mechanism for detecting presence or absence of a connection of the cable provided in the connector and a determination result of whether an external apparatus in an active state is connected via the cable, to display on the display panel indicia identifying a type of apparatus connected to the connector and uniquely identifying the connector, in association with a connector indication indicating the connector is in a first mode when the detection result is presence of a connection of the cable and in a second mode when the determination result is the external apparatus is not in an active state, the first mode being set different from the second mode and the second mode being displayed such that the connector being connected with the cable and the external apparatus not being in the active state is distinguished from display on the display panel of a third mode of the connector indication when the detection result is absence of a connection of the cable.

9. An image display device, comprising:
a connector connected with a cable through which a video signal is transmitted;
a display panel for displaying an image based on the video signal inputted via the cable from an external apparatus to the connector;
a display controller for displaying a connector indication indicating the connector on the display panel; and
an active determination unit for determining, on the basis of a potential state of a predetermined line of a cable connected to the connector, whether an external apparatus in an active state is connected via the cable,
wherein the display controller changes a connector indication mode displayed on the display panel, according to a detection result indicating presence or absence of a connection of the cable and a determination result of the active determination unit, to display on the display panel indicia identifying a type of apparatus connected to the connector and uniquely identifying the connector, in association with the connector indication indicating the connector in a first mode when the detection result is presence of a connection of the cable and in a second mode when the determination result is the external apparatus is in not an active state, the first mode being set different from the second mode and the second mode being displayed such that the connector being connected with the cable and the external apparatus not being in the active state is distinguished from display on the display panel of a third mode of the connector indication when the detection result is absence of a connection of the cable.

10. The image display device according to claim 9, wherein the connector is a connector for inputting a baseband video signal transmitted via the cable by a differential signal from the external apparatus through a plurality of channels.

11. The image display device according to claim 9, further comprising:
a user operation unit for selecting a connector indication displayed on the display panel to perform an input switching; and
wherein the user operation unit limits a connector indication selectable by the user operation unit, to a connector indication indicating a connector connected via the cable with an external apparatus in an active state, according to a determination result of the active determination unit.

12. The image display device according to claim 9, wherein:
the connector includes a cable detection mechanism for detecting presence or absence of a connection of the cable, and
the display controller changes a connector indication mode displayed on the display panel, according to a detection result of the cable detection mechanism together with a determination result of the active determination unit.

13. The image display device according to claim 12, wherein:
the cable detection mechanism is composed of a contact piece attached to an outer sheath of the connector in an electrically floated state, and
when the cable is connected to the connector, the outer sheath of the connector and the contact piece are electrically connected via a plug provided in an end of the cable fitted into the outer sheath of the connector.

14. A connector indication method in an image display device, the image display device including a connector connected with a cable through which a video signal is transmitted, and a display panel for displaying an image based on the video signal inputted via the cable to the connector from an external apparatus, the connector indication method comprising:
a connector indication step of displaying a connector indication indicating the connector on the display panel; and
a display-mode changing step of changing a connector indication mode displayed on the display panel according to a potential state of a predetermined line of a cable connected to the connector, to display on the display panel indicia identifying a type of apparatus connected to the connector and uniquely identifying the connector, in association with a connector indication indicating the connector in a first mode when a detection result is presence of a connection of the cable with the connector and in a second mode when a determination result is an external apparatus connected via the cable is not in an active state, the first mode being set different from the second mode and the second mode being displayed such that the connector being connected with the cable and the external apparatus not being in the active state is distinguished from display on the display panel of a third mode of the connector indication when the detection result is absence of a connection of the cable.

* * * * *